United States Patent [19]
Ono et al.

[11] Patent Number: 5,396,367
[45] Date of Patent: Mar. 7, 1995

[54] ZOOM LENS ASSEMBLY

[75] Inventors: Shusuke Ono, Takatsuki; Hisayuki II, Katano; Hiroaki Okayama, Hirakata; Yasuo Nakajima, Ibaraki, all of Japan

[73] Assignee: Matsushita Electric Industrial Co., Ltd., Osaka, Japan

[21] Appl. No.: 46,714

[22] Filed: Apr. 16, 1993

[30] Foreign Application Priority Data

Apr. 17, 1992 [JP] Japan .................. 4-098214
Oct. 15, 1992 [JP] Japan .................. 4-276417

[51] Int. Cl.$^6$ ............... G02B 15/14; G02B 13/18
[52] U.S. Cl. .................... 359/687; 359/708; 348/358
[58] Field of Search ........... 359/687, 683, 676, 708; 348/358

[56] References Cited

U.S. PATENT DOCUMENTS

| | | | |
|---|---|---|---|
| 4,802,747 | 2/1989 | Horiuchi | 359/687 |
| 4,818,083 | 4/1989 | Mihara | 359/687 |
| 4,859,042 | 8/1989 | Tanaka | 359/687 |
| 5,100,223 | 3/1992 | Ono et al. | 359/683 |
| 5,221,994 | 6/1993 | Nishio | 359/687 |

FOREIGN PATENT DOCUMENTS 0320021 6/1989 European Pat. Off. .
0405532 1/1991 European Pat. Off. .

*Primary Examiner*—Scott J. Sugarman
*Attorney, Agent, or Firm*—Wenderoth, Lind & Ponack

[57] ABSTRACT

A zoom lens assembly includes, in succession order from the object side, a first fixed lens group of a positive refractive power including a negative lens, a positive lens and a positive meniscus lens; a second movable lens group of a negative refractive power including a negative meniscus lens, a positive lens and a positive lens for effecting a variation of image magnification by moving along an optical axis of the zoom lens assembly; a third fixed lens group of a positive refractive power having at least one aspherical face and including a positive lens and a negative lens; and a fourth movable lens group of a positive refractive power including having at least one aspherical surface and also including negative and positive lenses cemented together.

7 Claims, 12 Drawing Sheets

Spherical Aberration (mm)

Astigmatism (mm)

Distortion(%)

Spherical Aberration(mm)

Astigmatism(mm)

Distortion(%)

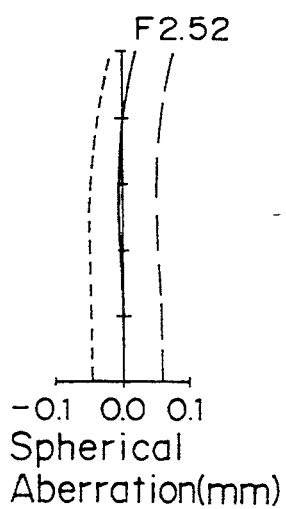 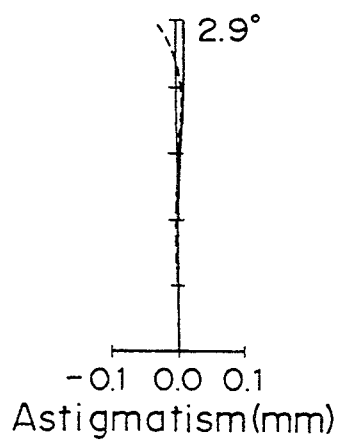 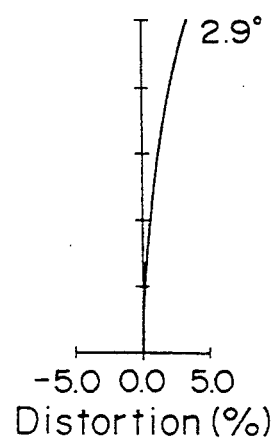
Fig. 5(a)    Fig. 5(b)    Fig. 5(c)
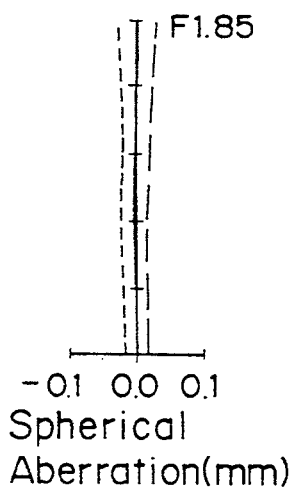 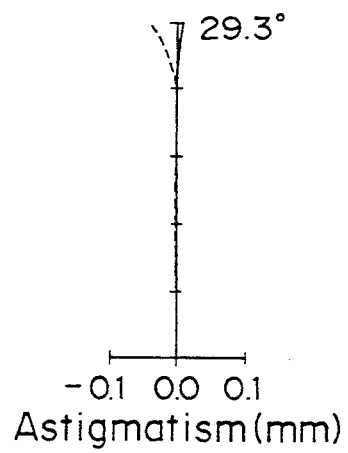 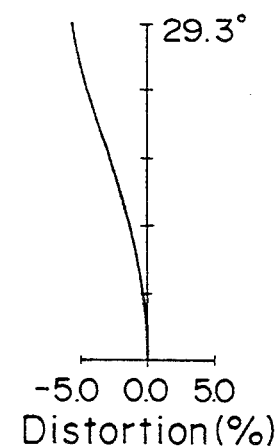
Fig. 6(a)    Fig. 6(b)    Fig. 6(c)

Spherical Aberration(mm)

Astigmatism(mm)

Distortion(%)

Spherical Aberration(mm)

Astigmatism(mm)

Distortion(%)

Spherical
Aberration(mm)

Astigmatism(mm)

Distortion(%)

Spherical
Aberration(mm)

Astigmation(mm)

Distortion(%)

Spherical Aberration(mm)

Astigmatism(mm)

Distortion(%)

Spherical Aberration(mm)

Astigmatism(mm)

Distortion(%)

Spherical Aberration(mm)

Astigmatism(mm)

Distortion (%)

Spherical Aberration(mm)

Astigmatism(mm)

Distortion(%)

-0.1 0.0 0.1
Spherical
Aberration(mm)

-0.1 0.0 0.1
Astigmatism(mm)

-5.0 0.0 5.0
Distortion(%)

-0.1 0.0 0.1
Spherical
Aberration (mm)

-0.1 0.0 0.1
Astigmatism(mm)

-5.0 0.0 5.0
Distortion(%)

Spherical Aberration(mm)

Astigmatism (mm)

Distortion (%)

Spherical Aberration(mm)

Astigmatism (mm)

Distortion (%)

Fig.23(a) Fig.23(b) Fig.23(c)
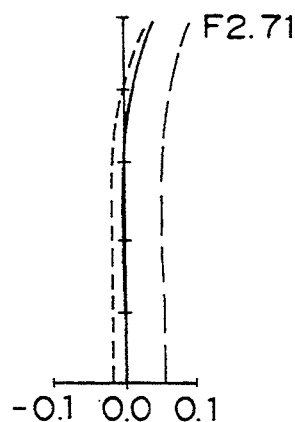
-0.1 0.0 0.1
Spherical
Aberration(mm)
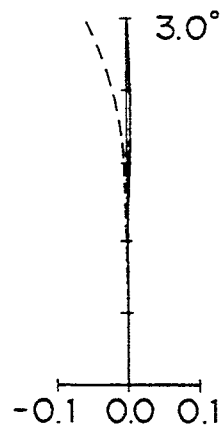
-0.1 0.0 0.1
Astigmatism(mm)
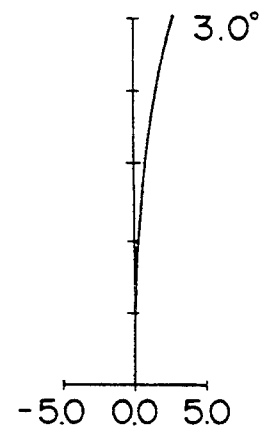
-5.0 0.0 5.0
Distortion(%)
Fig.24
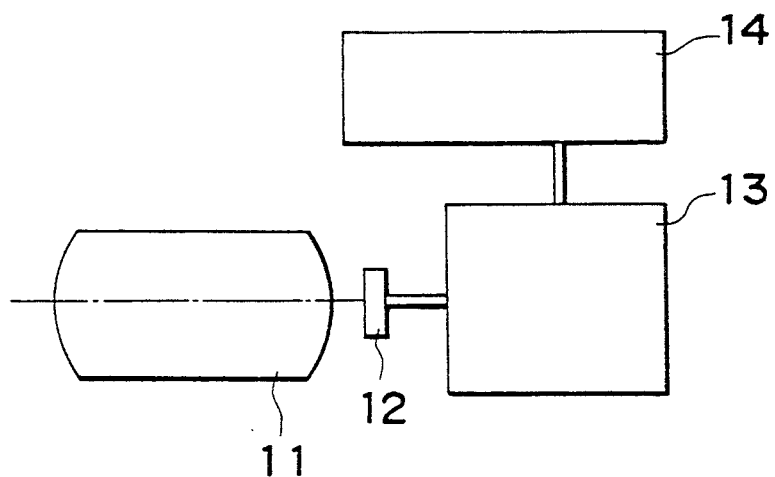

ZOOM LENS ASSEMBLY

BACKGROUND OF THE INVENTION

1. Field of the Invention

The present invention relates to a high performance zoom lens assembly for use with, for example, a video camera.

2. Description of the Prior Art

In recent years, demands have been made to provide a video camera not only with an easy-to-operate feature and a quick-to-operate feature, but also with a capability of presenting high quality images and an availability of multi-functions. To satisfy those demands, a high-resolution compact imaging device of ⅓ inch in size has been widely employed, and a compact imaging device of ¼ inch in size is currently in use. Along therewith, a high-performance compact and light-weight zoom lens having a large aperture ratio is strongly desired. However, not only is a reduction in cost desired, but a realization of a high-magnification zoom lens employing a reduced number of component parts without sacrificing the high performance is also desired.

However, when it comes to a high-magnification zoom lens, not only are an increased lens diameter and an increased lens length required, but an increased number of lens elements is also required for accomplishing a strict correction of aberrations, resulting in an increase in manufacturing cost and also in size and weight to such an extent that the resultant zoom lens is not suited for-use in a video camera for home use. Accordingly, the compact and light-weight zoom lens assembly currently largely employed in video cameras for home use and of a type comprising about 10 lens elements and having an F-number of about 1.4 to 2.0 has a zooming ratio of 6 to 8.

A prior art zoom lens assembly of the type referred to above as disclosed in, for example, U.S. Pat. No. 5,100,223, issued Mar. 31, 1992 (based on Japanese Patent Application No. 1-169295) will now be discussed with reference to FIG. 2.

FIG. 2 illustrates an optical system of the prior art zoom lens assembly for use with a video camera. The prior art zoom lens assembly comprises, in the order the left as viewed therein, a first lens group 21 forming an image forming unit, a second lens group 22 forming a zooming unit, a third lens group 23 forming a light condensing unit, a fourth lens group 24 forming a focusing unit and a glass plate 25 which is an equivalent to a quartz filter and the faceplate of the image device or the like. Reference numeral 26 represents an image forming plane.

The prior art zoom lens assembly shown in FIG. 2 operates in the following manner. The first lens group 21 fixed relative to the image forming plane 26 plays an image forming role, while the second lens group 22 is movable along the optical axis of the zoom lens assembly to vary the magnification which in turn varies the focal length of the zoom lens assembly as a whole. The third lens group 23, which is a fixed lens group, acts to collect rays of light dispersed by the second lens group 22, while the fourth lens group 24 movable along the optical axis plays a focusing role. A change in position of the image resulting from a movement of the second lens group 22 during a zooming operation is compensated for by a movement of the fourth lens group 24 to keep the image focused on the image plane 26 at all times.

The prior art zoom lens assembly of the type referred to above, however, has a problem in that it is difficult to correct aberrations over a zooming region and over a range of photo-taking distances, particularly, chromatic aberrations, when the zooming ratio of 10 is chosen and it is therefore difficult to produce a high quality image with the assembly.

SUMMARY OF THE INVENTION

The present invention has been developed to substantially eliminate the above-discussed problem and aims to provide an improved high performance zoom lens assembly having a zooming ratio of about 10 for use in a video camera which is compact and capable of satisfactorily correcting various aberrations including chromatic aberrations, and also aims to provide a video camera utilizing the improved zoom lens assembly.

To this end, a zoom lens assembly according to the present invention comprises, in succession from the object side, a first lens group having a positive refractive power and having an image forming function; a second lens group having a negative refractive power for effecting a variation of image magnification by moving along an optical axis of the zoom lens assembly; a third lens group having a positive refractive power and also having a light condensing function, said third lens group including an aspherical lens; and a fourth lens group having a positive refractive power and also having a focus adjusting function, said fourth lens group including an aspherical lens.

In succession from the object side, the first lens group includes a negative lens, a positive lens and a positive meniscus lens; the second lens group includes a negative meniscus lens, a negative lens and a positive lens; the third lens group has at least one aspherical surface and includes a positive lens and a negative lens; and the fourth lens group includes a lens having at least one aspherical surface and also including a negative lens and a positive lens. Each of the first to fourth lens groups employed in the zoom lens assembly of the present invention has a type and a surface configuration both preferred to minimize the aberrations.

More specifically, the third lens group preferably includes, in succession from the object side, a positive lens having a convex surface oriented towards the object side and a negative lens having a concave surface oriented towards the image forming plane and has at least one aspherical surface.

More preferably, the fourth lens group includes a negative lens having a concave surface oriented towards the image forming plane and a positive lens having a convex surface oriented towards the object side, said negative and positive lenses being cemented together.

Preferably, the zoom lens assembly of the present invention satisfies the following conditions.

(1) $3.0 < f1/fW < 8.0$
(2) $0.5 < |f2|/fW < 1.6$
(3) $2.0 < f3/fW < 7.0$
(4) $2.0 < f4/fW < 5.0$
(5) $0.02 < d14/f4 < 1.0$
(6) $0.3 < r11/f3 < 1.5$
(7) $0.3 < |r14|/f4 < 2.0$
(8) $0.2 < |r16|/f4 < 1.5$ wherein fW represents the focal length at a wide-angle end; fi (i = 1, 2, 3 and 4) represents the focal length of the i-th lens groups along the optical axis; d14 represents an air space between the third and fourth lens groups; r11 represents the radius of curvature of an object side surface of the positive lens forming the third lens group; r14 represents the radius of curvature of an image side surface of the negative lens forming the third lens group; and r16 represents the radius of curvature of the cemented surfaces of the lenses of the fourth lens group.

More preferably, the Z value of the negative lens of the fourth lens group is chosen to satisfy the following condition.

(9) $Z = (1/r16 - 1/r15) \cdot D/4 > 0.09$ wherein r15 represents the radius of curvature of an object side surface, facing forwards the object side, of the negative lens forming the fourth lens group; r16 represents the radius of curvature of the cemented surfaces of the cemented lenses of the fourth lens group; and D represents the diameter of the negative lens of the fourth lens group.

Again, the second negative lens of the second lens group from the object side preferably has opposite concave surfaces of equal radii of curvature.

A video camera designed to accomplish the above-described objects of the present invention comprises the zoom lens assembly of the present invention, an imaging element, a signal processing circuit and a viewfinder.

According to the present invention, the first lens group including a negative lens, a positive lens and a positive meniscus lens, the second lens group including a negative meniscus lens, a negative lens and a positive lens, the third lens group having at least one aspherical surface and including a positive lens and a negative lens, and the fourth lens group including a lens having at least one aspherical surface and also including a negative lens and a positive lens, comprise a high magnification zoom lens assembly having a simple structure and a zooming ratio of about 10.

If the conditions (1) to (8) are satisfied, the high performance zoom lens assembly is effective to correct aberrations satisfactorily.

If the condition (9) is additionally satisfied, any possible centering error which would occur when the negative lens of the fourth lens group is minimized.

The zoom lens assembly according to the present invention makes it possible to realize a compact and lightweight, high magnification video camera capable of providing a high quality image.

Thus, the present invention is effective to provide, for example, a high performance zoom lens assembly having a minimized number of, for example, 10, lens elements and also having an F-number of about 1.8, a zooming ratio of about 10 with chromatic aberrations corrected satisfactorily. In addition, if this zoom lens assembly of the present invention is utilized, a compact, lightweight high performance video camera can be realized.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIGS. 3 to 5 are graphs showing various aberrations exhibited by the zoom lens assembly of FIG. 1 when the zoom lens assembly is set at a wide-angle end, a standard setting and a telephoto end, respectively;

FIGS. 6 to 8 are graphs similar to FIGS. 3 to 5, respectively, exhibited by a second embodiment of the zoom lens assembly according to the present invention;

FIGS. 21 to 23 are graphs similar to FIGS. 3 to 5, respectively, exhibited by a seventh embodiment of the zoom lens assembly according to the present invention; and FIG. 24 is a schematic block diagram of a video camera according to the present invention.

DETAILED DESCRIPTION OF THE PREFERRED EMBODIMENTS

Figure 1:
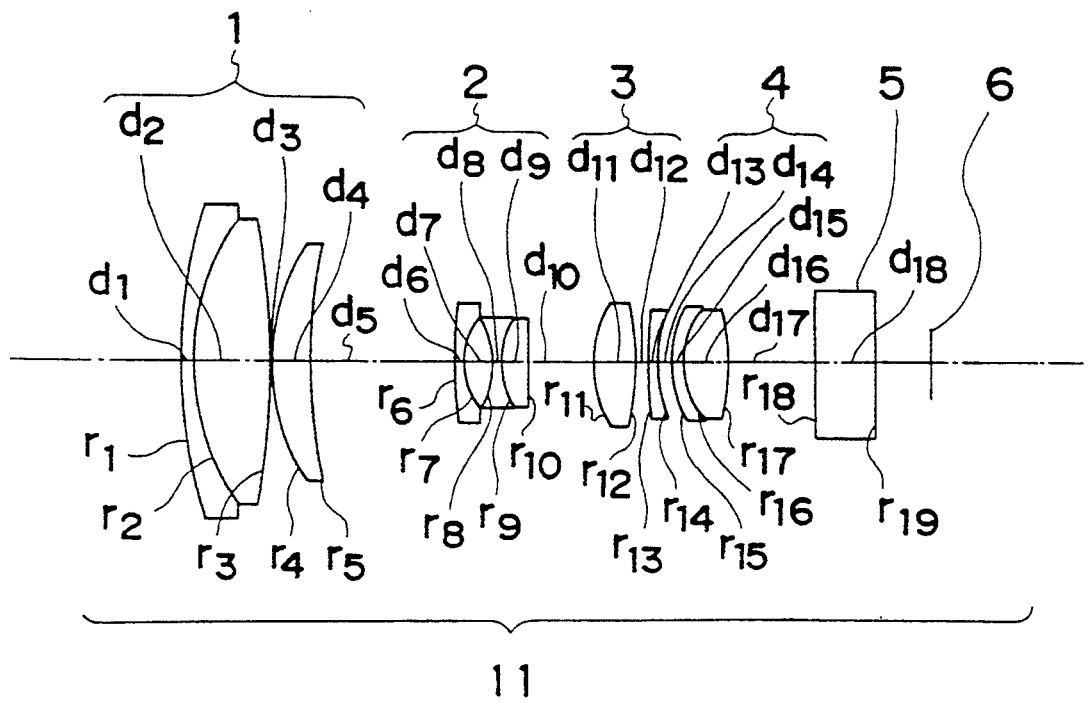
FIG. 1 is a schematic diagram of an optical system of a first embodiment of a zoom lens assembly according to the present invention.
Figure 2:
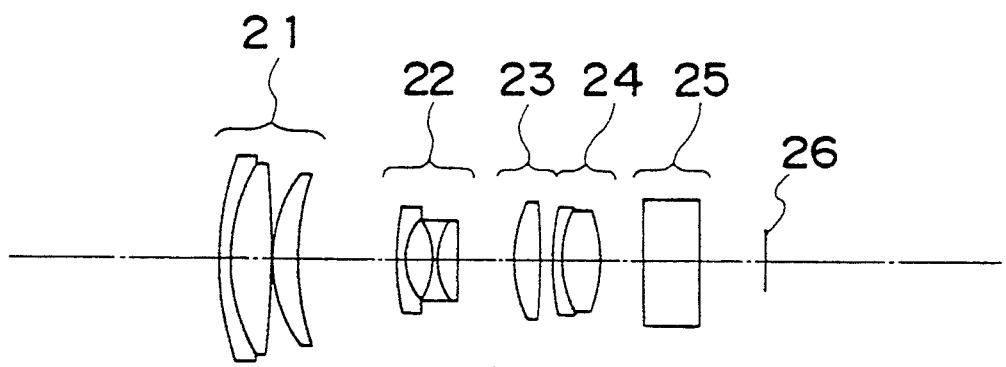
FIG. 2 is a schematic diagram of an optical system employed by the prior art zoom lens assembly.

Referring now to FIG. 1, a zoom lens assembly according to the present invention comprises, in the order from an object side where an object to be photographed or videoed is situated, a first lens group 1, a second lens group 2, a third lens group 3, a fourth lens group 4, a flat plate 5 which is an optical equivalent of a quartz filter and the faceplate of the image device or the like, and an image plane 6. The first lens group has a positive refractive power and also has an image forming function; the second lens group has a negative refractive power and is movable along the optical axis of the zoom lens assembly for zooming, i.e., focal length adjustment; the third lens group has a positive refractive power and also has a light condensing function; and the fourth lens group has a positive refractive power and is movable along the optical axis of the zoom lens assembly for focus adjustment.

In the successive order from the object side, the first lens group includes cemented lenses and a meniscus lens having a positive refractive power; the second lens group 2 includes a meniscus lens having a negative refractive power and cemented lenses; the third lens group has at least one aspherical surface and includes a positive lens and a negative lens; and the fourth lens group includes a lens having at least one aspherical surface and also including a negative lens, and a positive lens which is cemented together with the negative lens.

In order to make the zoom lens assembly compact, it is necessary to increase the refractive power of each of the lens groups. The conditions (1), (2), (3) and (4) identified in the Summary of the Invention define the refractive power of each of the lens groups and stipulate respective ranges which give an increased refractive power required to realize the compactness and optimize the lens type of and the surface configuration of each lens group.

The condition in which the third lens group has at least one aspherical surface and includes, in the order from the object side, a positive lens having a convex surface oriented towards the object side and a negative lens having a concave surface oriented towards the image forming plane 6 makes it essential to employ two lenses to form the third lens group 3 and also to compensate for various aberrations resulting from the large aperture of about 1.8 in F-number. In fact, the aspherical surface configuration of the third lens group is effective to correct a spherical aberration.

The condition in which the fourth lens group 4 includes a negative lens having a concave surface oriented towards the image forming plane and a positive lens having a convex surface oriented towards the object side and cemented together with the negative lens and, yet, has at least one aspherical surface, makes it essential to employ a minimized number of, for example, two, lenses to form the fourth lens group 4 and also to compensate for on-axis and off-axis chromatic aberrations and also for a monochromatic off-axis aberration and, particularly, coma.

Each of the conditions (1) to (9) will now be discussed in detail.

The condition (1) is associated with the refractive power of the first lens group 1. If the ratio f1/fW is smaller than the lower limit, the refractive power of the first lens group 1 will become too large to make it difficult to compensate for the spherical aberration at a setting of establishing a long focal length. On the other hand, if the ratio f1/fW is greater than the upper limit, the zoom lens assembly as a whole will have an increased length and no compact zoom lens assembly can be realized.

The condition (2) is associated with the refractive power of the second lens group 2. Although the zoom lens assembly as a whole can be made compact if the ratio $|f2|/fW$ is smaller than the lower limit, Petzval's sum of the zoom lens assembly as a whole will become large and negative to such an extent that no particular glass material will bring about a correction of field curvature. On the other hand, if the ratio f2/fW is greater than the upper limit, an aberration can easily be corrected, but the zooming system tends to be lengthened making it impossible to provide a compact zoom lens assembly.

The condition (3) is associated with the refractive power of the third lens group 3. If the ratio f3/fW is smaller than the lower limit, the refractive power of the third lens group 3 will become excessively large and not only can a back focal distance in which the quartz filter is inserted not be realized, but the correction of the spherical aberration becomes difficult to achieve. On the other hand, if this ratio is greater than the upper limit, a composite optical system including the first to third lens groups 1 to 3 will become a divergent optical system and, therefore, the lens diameter of the fourth lens group 4 cannot be reduced while Petzval's sum of the entire optical system also cannot be reduced.

The condition (4) is associated with the refractive power of the fourth lens group 4. If the ratio f4/fW becomes smaller than the lower limit, the quantity of light at a corner of the image becomes small and the lens size of the first lens group 1 must be increased in order to compensate for the reduction in quantity of light at the corner of the image, making it impossible to realize compact and lightweight features in the zoom lens assembly. On the other hand, if this ratio exceeds the upper limit, aberrations can easily be corrected, but the fourth lens group 4 requires an increased stroke for its movement when the zoom lens assembly is set at a close photo-taking range, not only making it impossible to realize a compactness of the zoom lens assembly, but also making it difficult to compensate for an imbalance between an off-axis aberration exhibited when the zoom lens assembly is set at the close photo-taking range and when the same is set at a distant photo-taking range.

The condition (5) is associated with the distance between the third lens group 3 and the fourth lens group 4. When the ratio d14/f4 is greater than the upper limit, the height of off-axis rays of light becomes small to such an extent that no particular glass material will bring about a correction of lateral chromatic aberration and, at the same time, the stroke of movement of the fourth lens group 4 at the time of photo-taking at a close range will be limited, resulting in the zoom lens assembly being incapable of focusing an object at a closest possible distance to the lens assembly. On the other hand, if this ratio becomes greater than the upper limit, the zoom lens assembly as a whole cannot be made compact. In addition, when a suitable quantity of light is desired to be ensured around the image plane, the lens size of the fourth lens group cannot be reduced.

The condition (6) is associated with the radius of curvature of the object side surface of the positive lens forming a part of the third lens group 3. By providing an aspherical surface on one or both of the sides of the object to be photographed and the side of the image plane and then selecting the shape thereof optimally, various aberrations can satisfactorily be corrected. However, if the ratio r11/f3 is smaller than the lower limit, correction of the spherical aberration will become difficult to achieve, but if the ratio is greater than the upper limit, correction of the coma formed by the off-axis light rays travelling below the principal rays of light becomes difficult to achieve.

The condition (7) is associated with the radius of curvature of the image side surface of the negative lens forming a part of the third lens group 3. By providing an aspherical surface on one or both of the sides of the object to be photographed and the side of the image plane and then selecting the shape thereof optimally, various aberrations can satisfactorily be corrected. However, if the ratio $|r14|/f4$ is smaller than the lower limit, excessive correction of the spherical aberration may occur, but if this ratio is greater than the upper limit, insufficient correction of the coma formed by the off-axis light rays travelling below the principal rays of light becomes difficult to achieve and no optimization of the shape of the aspherical surface will bring about satisfactory aberration performance.

The condition (8) is associated with the radius of curvature of the cemented surfaces of the lenses forming parts of the fourth lens group 4. By providing an aspherical surface on at least one of the object side surface of a lens having a negative refractive power and forming a part of the fourth lens group 4, the cemented surface and the image side surface of a lens having a positive refractive power forming a part of the fourth lens group 4 and then selecting the shape thereof optimally, a monochromatic aberration can satisfactorily be corrected while on-axis and lateral chromatic aberration are at the same time corrected. However, if the ratio $|r16|/f4$ is smaller than the lower limit, the angle of incidence of the light on these surfaces will become great making it difficult to correct the coma formed by the off-axis light rays travelling above the principal rays of light, and at the same time, a spherical aberration of F-line will take place excessively. On the other hand, if this ratio is greater than the upper limit, no practical selection of glass material will bring the on-axis and lateral chromatic aberrations within an acceptable range.

The condition (9) is associated with the Z-value of the negative lens forming a part of the fourth lens group 4. If this condition is satisfied, any possible centering error which would occur when the negative lens of the fourth lens group is subjected to a centering process can advantageously be minimized.

The condition in which the second negative lens of the lens group 2 from the object side has an absolute value of the same radius of curvature is advantageous in that the small lens of which it is generally very difficult to differentiate the radius of curvature, such as the second negative lens, will not be inadvertently inserted in the wrong orientation during assembly. It is to be noted that, in FIG. 1, the air space exists between the positive and negative meniscus lenses.

Specific values of the various parameters of the first embodiment of the zoom lens assembly according to the present invention are tabulated in Table 1.

TABLE 1

| Group | Surface | r | d | n | ν |
|---|---|---|---|---|---|
| 1 | 1 | 36.009 | 0.90 | 1.80518 | 25.4 |
|   | 2 | 16.984 | 4.90 | 1.58913 | 61.2 |
|   | 3 | −66.650 | 0.15 |   |   |
|   | 4 | 14.233 | 2.70 |   |   |
|   | 5 | 41.145 | Variable |   |   |
| 2 | 6 | 44.785 | 0.60 | 1.77250 | 49.6 |
|   | 7 | 5.156 | 1.90 |   |   |
|   | 8 | −6.139 | 0.60 | 1.67790 | 55.5 |
|   | 9 | 5.845 | 1.80 | 1.80518 | 25.4 |
|   | 10 | 147.190 | Variable |   |   |
| 3 | 11 | 7.283 | 2.80 | 1.60311 | 60.7 |
|   | 12 | −20.099 | 0.82 |   |   |
|   | 13 | 36.025 | 0.70 | 1.80518 | 25.4 |
|   | 14 | 10.417 | Variable |   |   |
| 4 | 15 | 8.208 | 0.70 | 1.80518 | 25.4 |
|   | 16 | 5.690 | 3.00 | 1.51633 | 64.1 |
|   | 17 | −15.764 | Variable |   |   |
| 5 | 18 | ∞ | 4.00 | 1.51633 | 64.1 |
|   | 19 | ∞ | — |   |   | wherein:
r: Radium of curvature of the surface,
d: Lens thickness or Air space between the lenses,
n: Refractive index relative to the d-line of each lens, and
ν: Abbe number relative to the d-line of each lens.

Figure 3A:
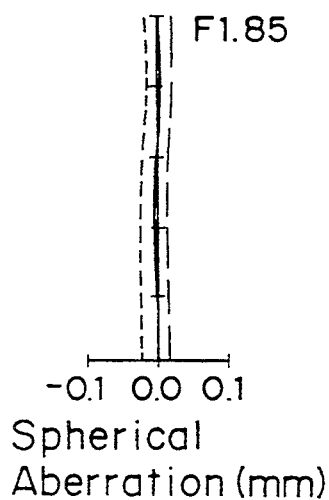
Figure 3B:
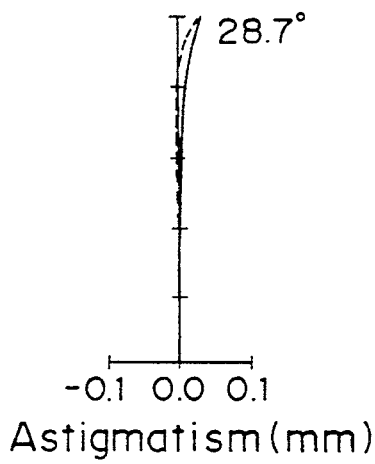
Figure 3C:
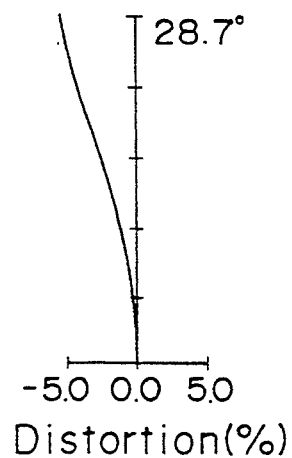
Figure 4A:
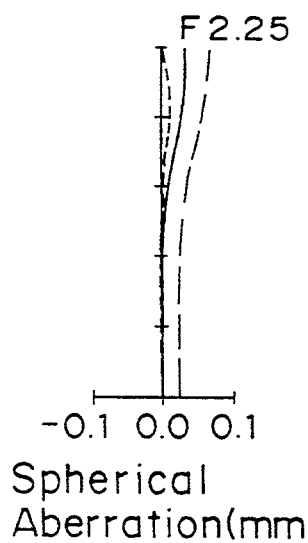
Figure 4B:
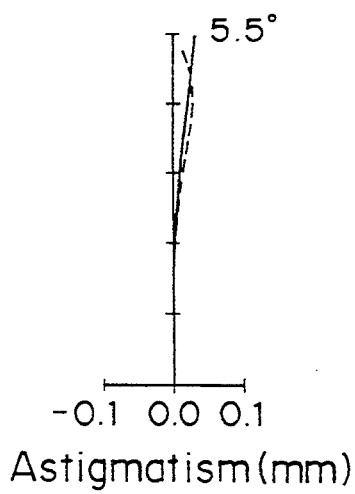
Figure 4C:
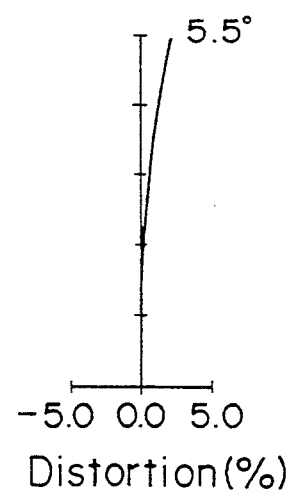

Spherical aberration, astigmatism and field distortion all exhibited by the first embodiment of the present invention are shown in FIGS. 3(a) to 3(c) when the zoom lens assembly is set at the wide-angle end, FIGS. 4(a) to 4(c) when the zoom lens assembly is set at the standard setting and FIGS. 5(a) to 5(c) when the zoom lens assembly is set at the telephoto end, respectively. It is to be noted that, in each of FIGS. 3(a), 4(a) and 5(a), solid lines, dotted lines and broken lines represent respective values relative to the d-line, the F-line and the C-line and that in each of FIGS. 3(b), 4(b) and 5(b) solid lines and dotted lines represent aberrations at meridional and sagittal image planes, respectively.

The aspherical shape is defined by the following equation.

$$Z = \frac{CY^2}{1 + \sqrt{1 - (1 + K)C^2Y^2}} + D \cdot Y^4 + E \cdot Y^6 + F \cdot Y^8 + G \cdot Y^{10}$$

wherein:
Z: Distance from top of the aspherical surface at a point on the aspherical surface spaced a height Y from the optical axis,
Y: Height from the optical axis,
C: Curvature (1/r) of the top of the aspherical surface,
K: Conical constant, and
D, E, F, G: Coefficient of asphericity.

The eleventh, fourteenth and seventeenth surface are aspherical surfaces having respective coefficients of asphericity as tabulated in Table 2.

TABLE 2

|   | 11th Face | 14th Face | 17th Face |
|---|---|---|---|
| K | −5.97319E − 1 | 3.42145E − 1 | −2.15688E + 1 |
| D | −1.81760E − 4 | 1.89782E − 4 | −2.35784E − 1 |
| E | −7.53020E − 6 | −1.01760E − 5 | 3.68488E − 5 |
| F | 2.56976E − 7 | 3.81949E − 7 | −1.84785E − 6 |
| G | −6.52307E − 9 | −2.26979E − 8 | 6.62663E − 8 |

Values of the lengths of air spaces along he optical axis which are variable with changes in focal length upon zooming, are tabulated in Table 3 when the zoom lens assembly is focused at an object at infinity, in Table 4 when the zoom lens assembly is focused at an object spaced 2 meters away from the front of the zoom lens assembly and in Table 5 when the zoom lens assembly is focused at an object spaced 1 meter away from the front of the zoom lens assembly, respectively.

TABLE 3

| | Object at infinity | | |
|---|---|---|---|
| | Wide-angle End | Standard Set. | Telephoto End |
| f | 4.344 | 21.491 | 42.886 |
| F/NO | 1.854 | 2.215 | 2.626 |
| d5 | 0.800 | 9.418 | 12.161 |
| d10 | 13.250 | 4.632 | 1.890 |
| d14 | 4.792 | 1.162 | 4.792 |
| d17 | 2.000 | 5.630 | 2.000 |

TABLE 4

| | Object at 2 meters away | | |
|---|---|---|---|
| | Wide-angle End | Standard Set. | Telephoto End |
| f | 4.343 | 22.818 | 42.224 |
| F/NO | 1.854 | 2.252 | 2.521 |
| d5 | 0.800 | 9.654 | 12.161 |
| d10 | 13.250 | 4.396 | 1.890 |
| d14 | 4.782 | 0.921 | 3.882 |
| d17 | 2.010 | 5.871 | 2.911 |

TABLE 5

| | Object at 1 meter away | | |
|---|---|---|---|
| | Wide-angle End | Standard Set. | Telephoto End |
| f | 4.343 | 24.260 | 41.642 |
| F/NO | 1.855 | 2.294 | 2.523 |
| d5 | 0.800 | 9.896 | 12.161 |
| d10 | 13.250 | 4.154 | 1.890 |
| d14 | 4.773 | 0.659 | 3.056 |
| d17 | 2.020 | 6.133 | 3.736 | wherein f and F/NO represent the focal length and the F-number, respectively.

In Tables 3 to 5, at the standard setting of the zoom lens assembly, the fourth lens group 4 occupies the position closest to the third lens group 3 regardless of the lens-to-object distance.

Specific values of the various parameters of a second embodiment of the zoom lens assembly according to the present invention are tabulated in Table 6.

TABLE 6

| Group | Surface | r | d | n | ν |
|---|---|---|---|---|---|
| 1 | 1 | 33.906 | 0.90 | 1.80518 | 25.4 |
|   | 2 | 15.943 | 5.30 | 1.67790 | 55.5 |
|   | 3 | −81.746 | 0.15 |   |   |
|   | 4 | 14.596 | 1.80 | 1.67790 | 55.5 |
|   | 5 | 21.105 | Variable |   |   |
| 2 | 6 | 33.780 | 0.60 | 1.67790 | 55.5 |
|   | 7 | 5.425 | 2.40 |   |   |
|   | 8 | −7.180 | 0.60 | 1.74400 | 44.9 |
|   | 9 | 5.255 | 2.60 | 1.80518 | 25.4 |
|   | 10 | −213.469 | Variable |   |   |
| 3 | 11 | 7.299 | 3.00 | 1.60311 | 60.7 |
|   | 12 | −16.458 | 1.57 |   |   |
|   | 13 | 27.796 | 0.70 | 1.84666 | 23.9 |
|   | 14 | 8.032 | Variable |   |   |
| 4 | 15 | 6.950 | 0.70 | 1.84666 | 23.9 |
|   | 16 | 5.642 | 2.90 | 1.51633 | 64.1 |
|   | 17 | −21.772 | Variable |   |   |
| 5 | 18 | ∞ | 4.00 | 1.51633 | 64.1 |
|   | 19 | ∞ | — |   |   |

The eleventh, twelfth and seventeenth surfaces are aspherical surfaces having respective coefficients of asphericity as tabulated in Table 7.

TABLE 7

|   | 11th Face | 12th Face | 17th Face |
|---|---|---|---|
| K | −3.78852E − 1 | −2.00148E + 1 | −4.32521E + 1 |
| D | −2.27610E − 4 | −3.01348E − 4 | 6.52644E − 5 |
| E | −1.42803E − 5 | 3.07697E − 7 | 5.50900E − 5 |
| F | 8.08452E − 7 | 1.80844E − 7 | −4.03897E − 6 |
| G | −4.19980E − 8 | −2.80572E − 8 | 1.55222E − 7 |

Values of the lengths of air spaces along the optical axis which are variable with changes in focal length upon zooming and which are exhibited when the zoom lens assembly is focused at an object spaced 2 meters away from the front of the zoom lens assembly, are tabulated in Table 8.

TABLE 8

|   | Object at 2 meters away | | |
|---|---|---|---|
|   | Wide-angle End | Standard Set. | Telephoto End |
| f | 4.343 | 22.818 | 42.224 |
| F/NO | 1.854 | 2.252 | 2.521 |
| d5 | 0.800 | 9.654 | 12.161 |
| d10 | 13.250 | 4.396 | 1.890 |
| d14 | 4.782 | 0.921 | 3.882 |
| d17 | 2.010 | 5.871 | 2.911 | wherein f and F/NO represent the focal length and the F-number, respectively.

Figure 7A:
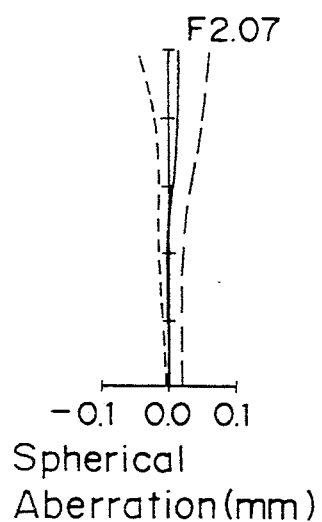
Figure 7B:
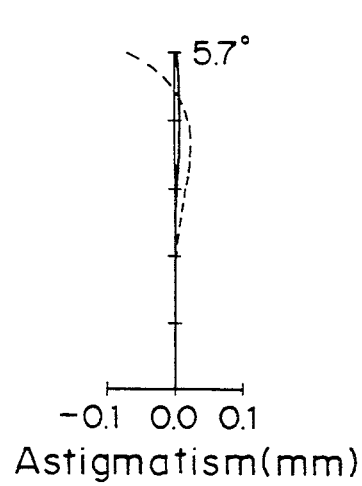
Figure 7C:
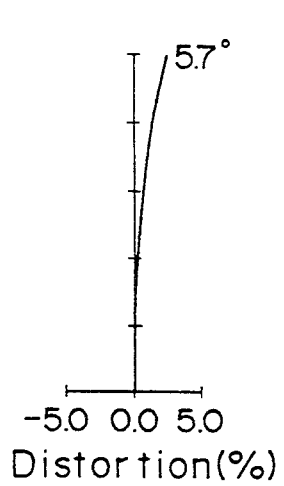
Figure 8A:
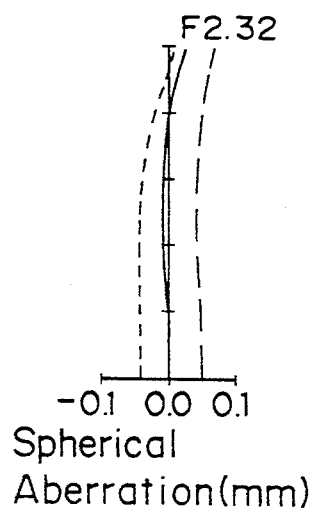
Figure 8B:
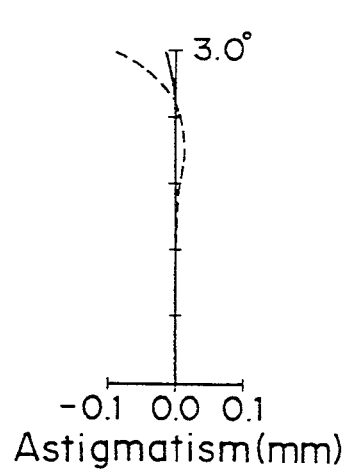
Figure 8C:
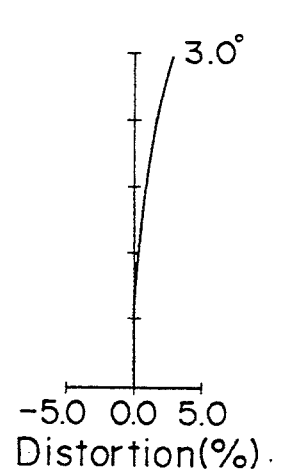

Spherical aberration, astigmatism and field distortion all exhibited by the second embodiment of the present invention are shown in FIGS. 6(a) to 6(c) when the zoom lens assembly is set at the wide-angle end, FIGS. 7(a) to 7(c) when the zoom lens assembly is set at the standard setting and FIGS. 8(a) to 8(c) when the zoom lens assembly is set at the telephoto end, respectively. It is to be noted that, in each of FIGS. 6(a), 7(a) and 8(a), solid lines, dotted lines and broken lines represent respective values relative to the d-line, the F-line and the C-line and that in each of FIGS. 6(b), 7(b) and 8(b) solid lines and dotted lines represent aberrations at meridional and sagittal image planes, respectively.

Specific values of the various parameters of a third embodiment of the zoom lens assembly according to the present invention are tabulated in Table 9.

TABLE 9

| Group | Surface | r | d | n | ν |
|---|---|---|---|---|---|
| 1 | 1 | 36.597 | 0.90 | 1.80518 | 25.4 |
|   | 2 | 16.852 | 4.90 | 1.58913 | 61.2 |
|   | 3 | −65.769 | 0.12 |   |   |
|   | 4 | 14.110 | 2.70 | 1.60311 | 60.7 |
|   | 5 | 41.278 | Variable |   |   |
| 2 | 6 | 41.278 | 0.60 | 1.77250 | 49.6 |
|   | 7 | 5.056 | 1.91 |   |   |
|   | 8 | −6.093 | 0.80 | 1.66547 | 55.2 |
|   | 9 | 6.093 | 1.79 | 1.79927 | 24.5 |
|   | 10 | 136.868 | Variable |   |   |
| 3 | 11 | 7.357 | 2.80 | 1.60602 | 57.4 |
|   | 12 | −16.959 | 0.94 |   |   |
|   | 13 | 41.776 | 0.70 | 1.80518 | 25.4 |
|   | 14 | 9.653 | Variable |   |   |
| 4 | 15 | 7.803 | 1.00 | 1.79927 | 24.5 |
|   | 16 | 5.400 | 3.10 | 1.51450 | 63.1 |
|   | 17 | −16.243 | Variable |   |   |
| 5 | 18 | ∞ | 4.00 | 1.51633 | 64.1 |
|   | 19 | ∞ | — |   |   |

The eleventh, twelfth and seventeenth surfaces are aspherical surfaces having respective coefficients of asphericity as tabulated in Table 10.

TABLE 10

|   | 11th Face | 12th Face | 17th Face |
|---|---|---|---|
| K | −5.32087E − 1 | −2.25106E + 1 | −1.51435E + 1 |
| D | −1.71823E − 4 | −2.90632E − 4 | 3.10551E − 5 |
| E | −1.45803E − 5 | 2.49169E − 6 | 3.06352E − 5 |
| F | 8.86719E − 7 | 5.30822E − 7 | −1.95928E − 6 |
| G | −3.13821E − 8 | −2.95660E − 8 | 6.39734E − 8 |

The lengths of air spaces along he optical axis, which are variable with changes in focal length upon zooming and which are exhibited when the zoom lens assembly is focused at an object spaced 2 meters away from the front of the zoom lens assembly, are tabulated in Table 11.

TABLE 11

|   | Object at 2 meters away | | |
|---|---|---|---|
|   | Wide-angle End | Standard Set. | Telephoto End |
| f | 4.343 | 22.929 | 42.375 |
| F/NO | 1.854 | 2.289 | 2.534 |
| d5 | 0.800 | 9.655 | 12.167 |
| d10 | 13.260 | 4.405 | 1.893 |
| d14 | 4.826 | 0.911 | 3.940 |
| d17 | 2.010 | 5.952 | 2.896 | wherein f and F/NO represent the focal length and the F-number, respectively.

Figure 9A:
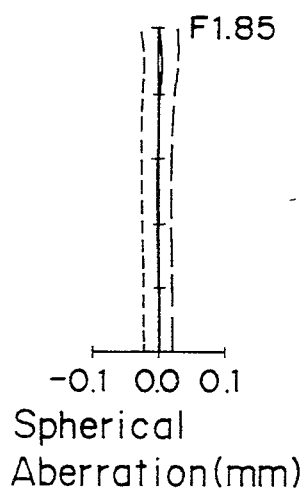
FIGS. 9 to 11 are graphs similar to FIGS. 3 to 5, respectively, exhibited by a third embodiment of the zoom lens assembly according to the present invention.
Figure 9B:
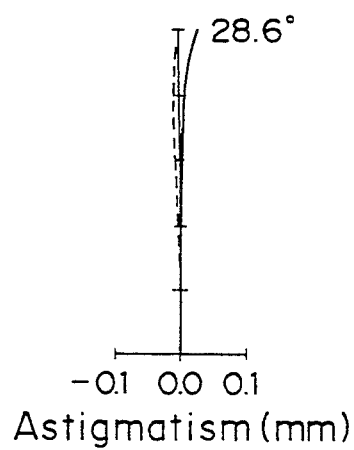
Figure 9C:
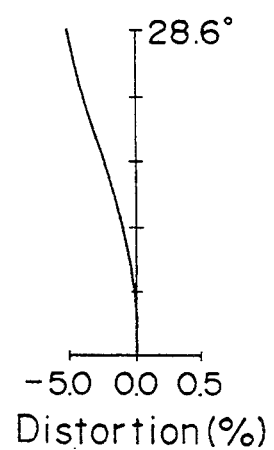
Figure 10A:
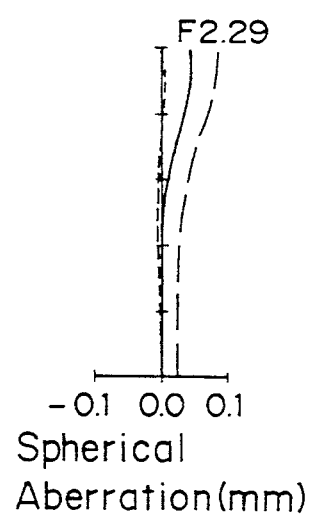
Figure 10B:
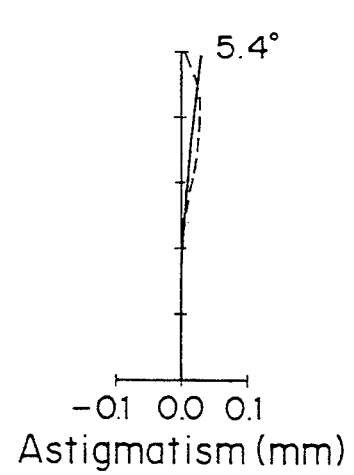
Figure 10C:
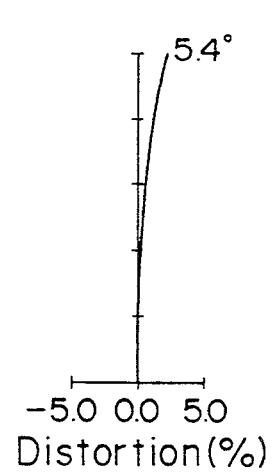
Figure 11A:
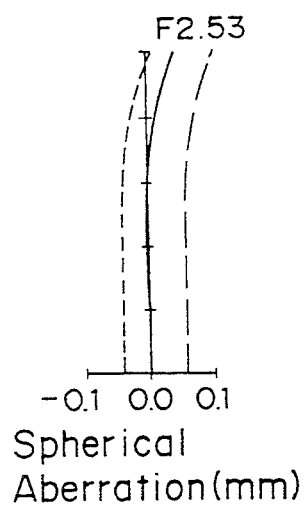
Figure 11B:
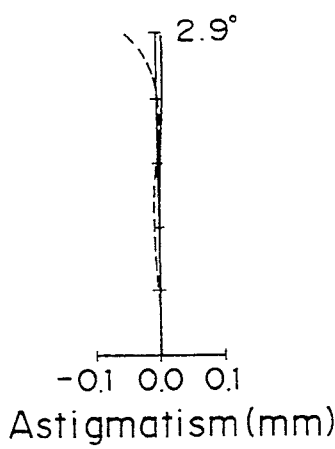
Figure 11C:
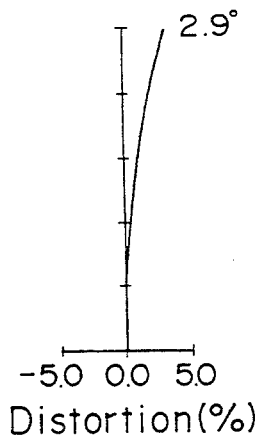

Spherical aberration, astigmatism and field distortion all exhibited by the third embodiment of the present invention are shown in FIGS. 9(a) to 9(c) when the zoom lens assembly is set at the wide-angle end, FIGS. 10(a) to 10(c) when the zoom lens assembly is set at the standard setting and FIGS. 11(a) to 11(c) when the zoom lens assembly is set at the telephoto end, respectively. It is to be noted that, in each of FIGS. 9(a), 10(a) and 11(a), solid lines, dotted lines and broken lines represent respective values relative to the d-line, the F-line and the C-line and that in each of FIGS. 9(b), 10(b) and 11(b) solid lines and dotted lines represent aberrations at meridional and sagittal image planes, respectively.

Specific values of the various parameters of a fourth embodiment of the zoom lens assembly according to the present invention are tabulated in Table 12.

TABLE 12

| Group | Surface | r | d | n | ν |
|---|---|---|---|---|---|
| 1 | 1 | 36.597 | 0.90 | 1.80518 | 25.4 |
|  | 2 | 16.852 | 4.90 | 1.58913 | 61.2 |
|  | 3 | −65.769 | 0.12 |  |  |
|  | 4 | 14.110 | 2.70 | 1.60311 | 60.7 |
|  | 5 | 41.278 | Variable |  |  |
| 2 | 6 | 41.278 | 0.60 | 1.77250 | 49.6 |
|  | 7 | 5.056 | 1.91 |  |  |
|  | 8 | −6.093 | 0.80 | 1.66547 | 55.2 |
|  | 9 | 6.093 | 1.79 | 1.79927 | 24.5 |
|  | 10 | 136.868 | Variable |  |  |
| 3 | 11 | 7.326 | 2.80 | 1.60602 | 57.4 |
|  | 12 | −17.508 | 0.91 |  |  |
|  | 13 | 44.011 | 0.70 | 1.80518 | 25.5 |
|  | 14 | 10.288 | Variable |  |  |
| 4 | 15 | 9.401 | 0.80 | 1.84666 | 23.9 |
|  | 16 | 6.000 | 2.90 | 1.60602 | 57.4 |
|  | 17 | −20.386 | Variable |  |  |
| 5 | 18 | ∞ | 4.00 | 1.51633 | 64.1 |
|  | 19 | ∞ | — |  |  |

The eleventh, twelfth and seventeenth surfaces are aspherical surfaces having respective coefficients of asphericity as tabulated in Table 13.

TABLE 13

|  | 11th Face | 12th Face | 17th Face |
|---|---|---|---|
| K | −5.31027E − 1 | −9.56058 | −4.14909 |
| D | −1.26176E − 4 | 1.13680E − 4 | 2.68819E − 4 |
| E | −5.03169E − 6 | −6.44825E − 6 | 6.51502E − 6 |
| F | 2.87530E − 7 | 4.13744E − 7 | −1.06380E − 7 |
| G | −9.16376E − 10 | −1.72856E − 9 | −4.69431E − 10 |

The lengths of air spaces along the optical axis, which are variable with changes in focal length upon zooming and which are exhibited when the zoom lens assembly is focused at an object spaced 2 meters away from the front of the zoom lens assembly, are tabulated in Table 14.

TABLE 14

| | Object at 2 meters away | | |
|---|---|---|---|
|  | Wide-angle End | Standard Set. | Telephoto End |
| f | 4.350 | 22.572 | 42.336 |
| F/NO | 1.856 | 2.233 | 2.529 |
| d5 | 0.800 | 9.655 | 12.170 |
| d10 | 13.260 | 4.405 | 1.890 |
| d14 | 5.126 | 1.240 | 4.226 |
| d17 | 2.010 | 5.895 | 2.910 | wherein f and F/NO represent the focal length and the F-number, respectively.

Figure 12A:
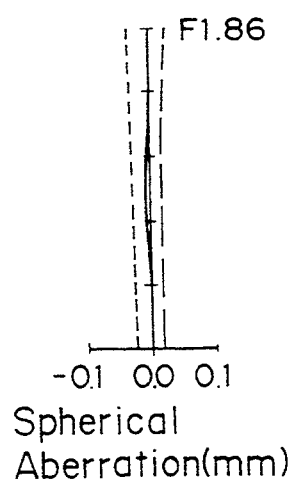
FIGS. 12 to 14 are graphs similar to FIGS. 3 to 5, respectively, exhibited by a fourth embodiment of the zoom lens assembly according to the present invention.
Figure 12B:
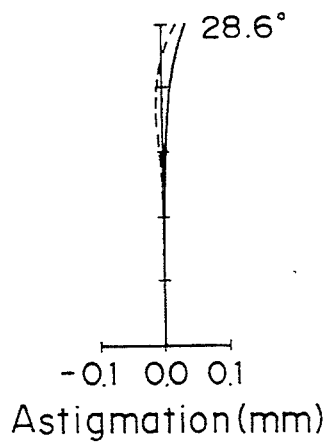
Figure 12C:
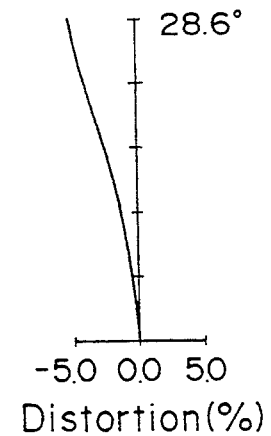
Figure 13A:
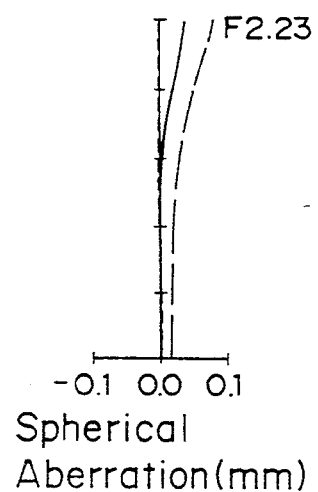
Figure 13B:
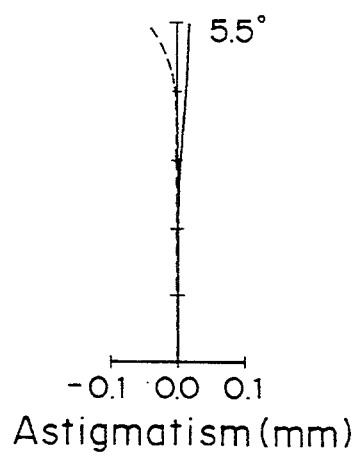
Figure 13C:
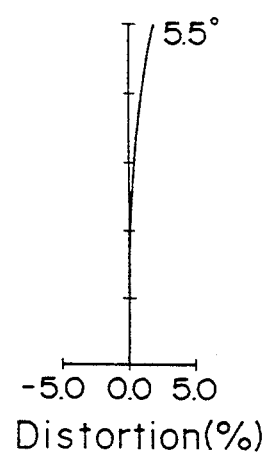
Figure 14A:
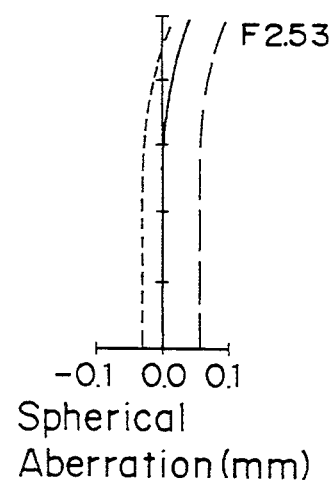
Figure 14B:
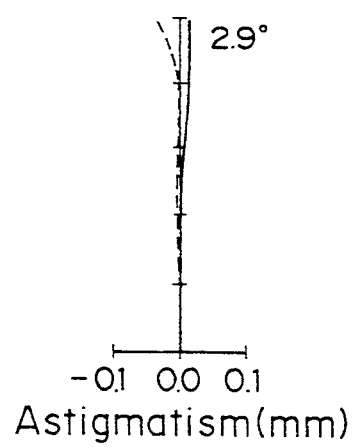
Figure 14C:
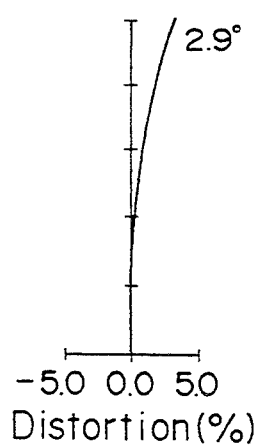

Spherical aberration, astigmatism and field distortion all exhibited by the fourth embodiment of the zoom lens assembly according to the present invention are shown in FIGS. 12 (a) to 12(c) when the zoom lens assembly is set at the wide-angle end, FIGS. 13(a) to 13(c) when the zoom lens assembly is set at the standard setting and FIGS. 14(a) to 14(c) when the zoom lens assembly is set at the telephoto end, respectively. It is to be noted that, in each of FIGS. 12(a), 13(a) and 14(a), solid lines, dotted lines and broken lines represent respective values relative to the d-line, the F-line and the C-line and that in each of FIGS. 12(b), 13(b) and 14(b) solid lines and dotted lines represent aberrations at meridional and sagittal image planes, respectively.

Specific values of the various parameters of a fifth embodiment of the zoom lens assembly according to the present invention are tabulated in Table 15.

TABLE 15

| Group | Surface | r | d | n | ν |
|---|---|---|---|---|---|
| 1 | 1 | 36.597 | 0.90 | 1.80518 | 25.4 |
|  | 2 | 16.852 | 4.90 | 1.58913 | 61.2 |
|  | 3 | −65.769 | 0.12 |  |  |
|  | 4 | 14.110 | 2.70 | 1.60311 | 60.7 |
|  | 5 | 41.278 | Variable |  |  |
| 2 | 6 | 41.278 | 0.60 | 1.77250 | 49.6 |
|  | 7 | 5.056 | 1.91 |  |  |
|  | 8 | −6.093 | 0.80 | 1.66547 | 55.2 |
|  | 9 | 6.093 | 1.79 | 1.79927 | 24.5 |
|  | 10 | 136.868 | Variable |  |  |
| 3 | 11 | 7.474 | 2.90 | 1.60602 | 57.4 |
|  | 12 | −16.980 | 1.07 |  |  |
|  | 13 | 46.609 | 0.7 | 1.80518 | 25.5 |
|  | 14 | 10.250 | Variable |  |  |
| 4 | 15 | 9.401 | 0.80 | 1.84666 | 23.9 |
|  | 16 | 6.120 | 2.90 | 1.60602 | 57.4 |
|  | 17 | −21.214 | Variable |  |  |
| 5 | 18 | ∞ | 4.00 | 1.51633 | 64.1 |
|  | 19 | ∞ | — |  |  |

The eleventh, twelfth and seventeenth surfaces are aspherical surfaces having respective coefficients of asphericity as tabulated in Table 16.

TABLE 16

|  | 11th Face | 12th Face | 17th Face |
|---|---|---|---|
| K | −7.52155E − 1 | −8.50418 | −7.13905E − 1 |
| D | −7.05771E − 5 | 9.32650E − 5 | 3.15765E − 4 |
| E | −5.45719E − 6 | −7.31403E − 6 | 4.23078E − 6 |
| F | 3.21874E − 7 | 4.53663E − 7 | 5.40588E − 8 |
| G | −2.07794E − 9 | −5.47877E − 9 | −5.12863E − 9 |

The lengths of air spaces along the optical axis, which are variable with changes in focal length consequent upon zooming and which are exhibited when the zoom lens assembly is focused at an object spaced 2 meters away from the front of the zoom lens assembly, are tabulated in Table 17.

TABLE 17

| | Object at 2 meters away | | |
|---|---|---|---|
|  | Wide-angle End | Standard Set. | Telephoto End |
| f | 4.452 | 22.046 | 42.128 |
| F/NO | 1.853 | 2.069 | 2.324 |
| d5 | 0.800 | 9.655 | 12.167 |
| d10 | 13.260 | 4.405 | 1.893 |
| d14 | 5.278 | 1.556 | 3.905 |
| d17 | 2.010 | 5.261 | 2.912 | wherein f and F/NO represent the focal length and the F-number, respectively.

Figure 15A:
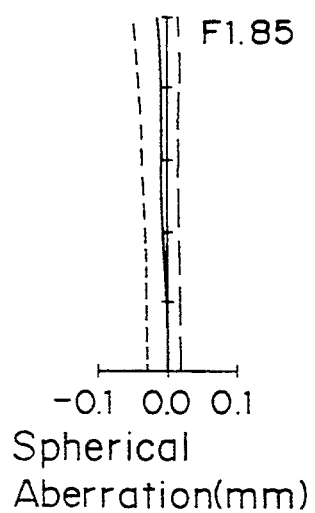
FIGS. 15 to 17 are graphs similar to FIGS. 3 to 5, respectively, exhibited by a fifth embodiment of the zoom lens assembly according to the present invention.
Figure 15B:
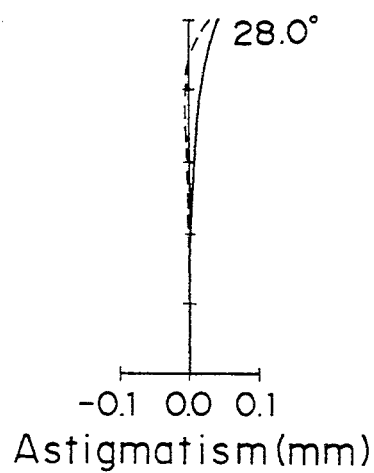
Figure 15C:
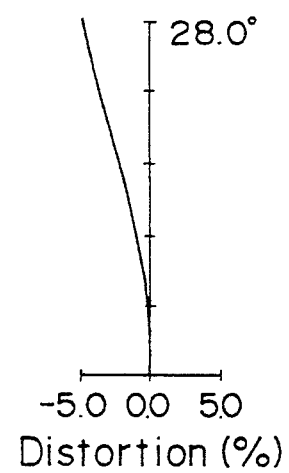
Figure 16A:
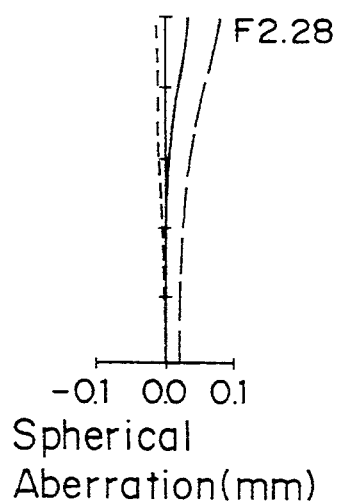
Figure 16B:
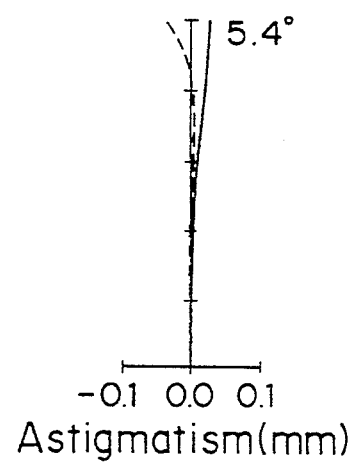
Figure 16C:
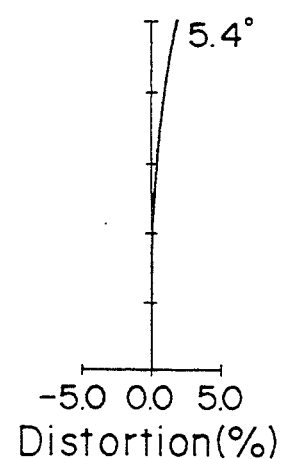
Figure 17A:
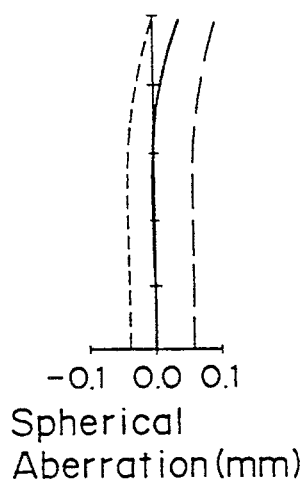
Figure 17B:
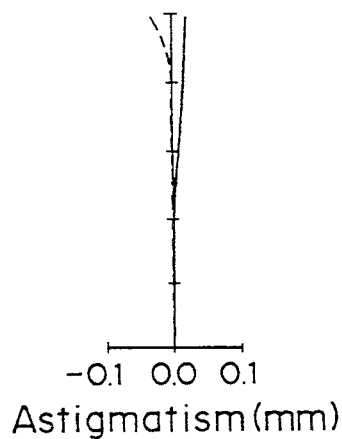
Figure 17C:
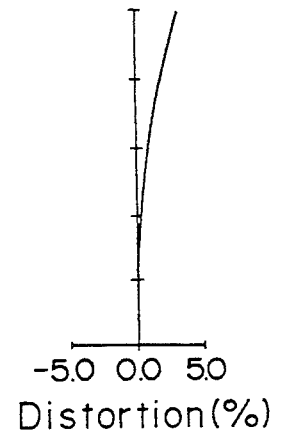

Spherical aberration, astigmatism and field distortion all exhibited by the fifth embodiment of the present invention are shown in FIGS. 15(a) to 15(c) when the zoom lens assembly is set at the wide-angle end, FIGS. 16(a) to 16(c) when the zoom lens assembly is set at the standard setting and FIGS. 17(a) to 17(c) when the zoom lens assembly is set at the telephoto end, respectively. It is to be noted that, in each of FIGS. 15(a), 16(a) and 17(a), solid lines, dotted lines and broken lines represent respective values relative to the d-line, the F-line and the C-line and that in each of FIGS. 15(b), 16(b) and 17(b) solid lines and dotted lines represent aberrations at meridional and sagittal image planes, respectively.

Specific values of the various parameters of a sixth embodiment of the zoom lens assembly according to the present invention are tabulated in Table 18.

TABLE 18

| Group | Surface | r | d | n | ν |
|---|---|---|---|---|---|
| 1 | 1 | 41.099 | 0.90 | 1.80518 | 25.4 |
|  | 2 | 18.520 | 5.10 | 1.58913 | 61.2 |
|  | 3 | −62.450 | 0.12 |  |  |
|  | 4 | 14.908 | 2.70 | 1.60311 | 60.7 |
|  | 5 | 38.640 | Variable |  |  |
| 2 | 6 | 38.640 | 0.60 | 1.77250 | 49.6 |
|  | 7 | 5.694 | 2.13 |  |  |
|  | 8 | −6.668 | 0.80 | 1.66547 | 55.2 |
|  | 9 | 6.668 | 1.90 | 1.79927 | 24.5 |
|  | 10 | 82.608 | Variable |  |  |
| 3 | 11 | 7.437 | 3.20 | 1.60602 | 57.4 |
|  | 12 | −16.418 | 1.29 |  |  |
|  | 13 | 34.280 | 0.6 | 1.80518 | 25.5 |
|  | 14 | 8.417 | Variable |  |  |
| 4 | 15 | 9.268 | 0.80 | 1.80518 | 25.5 |
|  | 16 | 6.116 | 2.90 | 1.60602 | 57.4 |
|  | 17 | −26.443 | Variable |  |  |
| 5 | 18 | ∞ | 4.00 | 1.51633 | 64.1 |
|  | 19 | ∞ | — |  |  |

The eleventh, twelfth and seventeenth surfaces are aspherical surfaces having respective coefficients of asphericity as tabulated in Table 19.

TABLE 19

|  | 11th Face | 12th Face | 17th Face |
|---|---|---|---|
| K | −8.97657E − 1 | −4.56501 | 8.31235 |
| D | −9.38070E − 5 | 1.07830E − 4 | 2.75578E − 4 |
| E | −1.90203E − 6 | −5.38185E − 6 | 7.19498E − 6 |
| F | 1.40979E − 7 | 2.75671E − 7 | −3.28682E − 7 |
| G | −3.98412E − 9 | −7.14998E − 9 | 1.03774E − 8 |

The lengths of air spaces along the optical axis, which are variable with changes in focal length upon zooming and which are exhibited when the zoom lens assembly is focused at an object spaced 2 meters away from the front of the zoom lens assembly, are tabulated in Table 20.

TABLE 20

| | Object at 2 meters away | | |
|---|---|---|---|
|  | Wide-angle End | Standard Set. | Telephoto End |
| f | 4.766 | 25.545 | 46.756 |
| F/NO | 1.854 | 2.270 | 2.714 |
| d5 | 0.800 | 10.613 | 13.356 |
| d10 | 14.536 | 4.723 | 1.980 |
| d14 | 5.708 | 1.229 | 4.613 |
| d17 | 2.011 | 5.490 | 3.106 | wherein f and F/NO represent the focal length and the F-number, respectively.

Figure 18A:
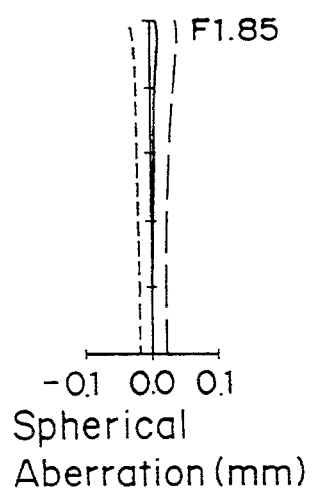
FIGS. 18 to 20 are graphs similar to FIGS. 3 to 5, respectively, exhibited by a sixth embodiment of the zoom lens assembly according to the present invention.
Figure 18B:
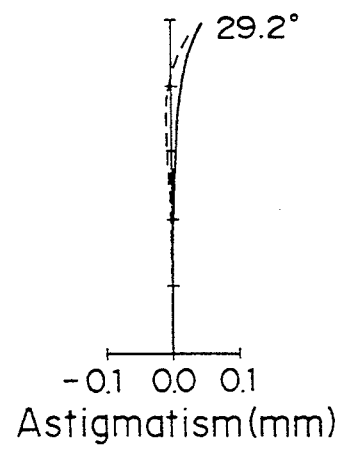
Figure 18C:
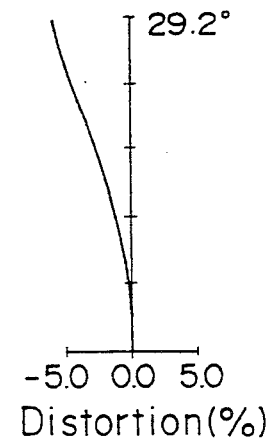
Figure 19A:
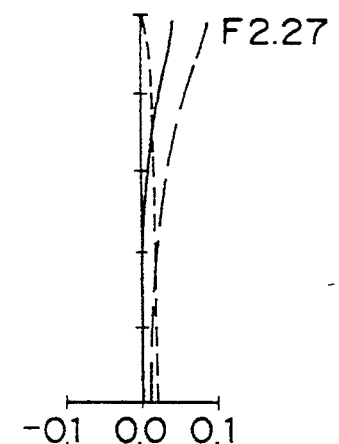
Figure 19B:
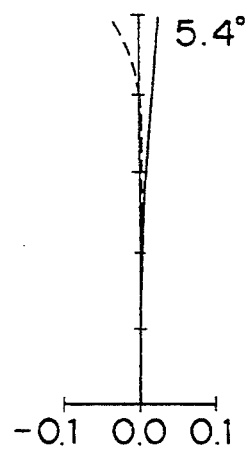
Figure 19C:
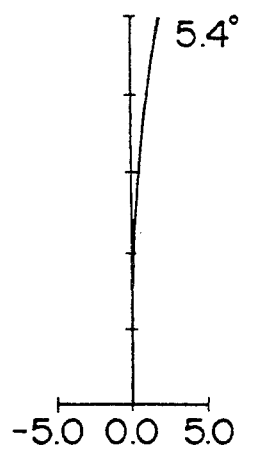
Figure 20A:
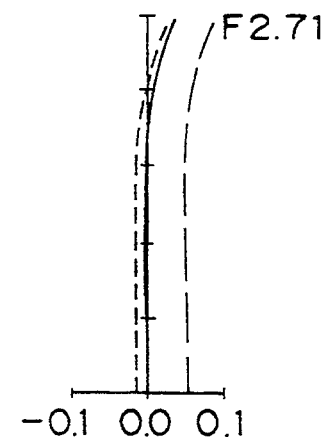
Figure 20B:
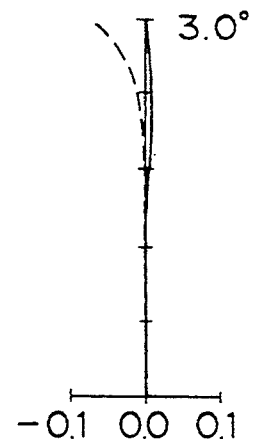
Figure 20C:
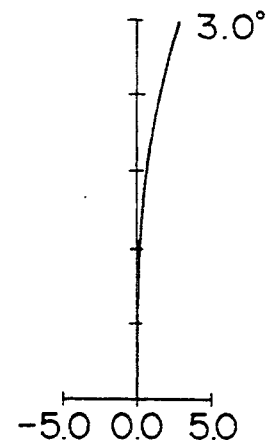

Spherical aberration, astigmatism and field distortion all exhibited by the sixth embodiment of the present invention are shown in FIGS. 18(a) to 18(c) when the zoom lens assembly is set at the wide-angle end, FIGS. 19(a) to 19(c) when the zoom lens assembly is set at the standard setting and FIGS. 20(a) to 20(c) when the zoom lens assembly is set at the telephoto end, respectively. It is to be noted that, in each of FIGS. 18(a), 19(a) and 20(a), solid lines, dotted lines and broken lines represent respective values relative to the d-line, the F-line and the C-line and that in each of FIGS. 18(b), 19(b) and 20(b) solid lines and dotted lines represent aberrations at meridional and sagittal image planes, respectively.

Specific values of the various parameters of a seventh the zoom lens assembly according to the present invention are tabulated in Table 21.

TABLE 21

| Group | Surface | r | d | n | ν |
|---|---|---|---|---|---|
| 1 | 1 | 41.099 | 0.90 | 1.80518 | 25.4 |
|  | 2 | 18.520 | 5.10 | 1.58913 | 61.2 |
|  | 3 | −62.450 | 0.12 |  |  |
|  | 4 | 14.908 | 2.70 | 1.60311 | 60.7 |
|  | 5 | 38.640 | Variable |  |  |
| 2 | 6 | 38.640 | 0.60 | 1.77250 | 49.6 |
|  | 7 | 5.694 | 2.13 |  |  |
|  | 8 | −6.668 | 0.80 | 1.66547 | 55.2 |
|  | 9 | 6.668 | 1.90 | 1.79927 | 24.5 |
|  | 10 | 82.608 | Variable |  |  |
| 3 | 11 | 7.598 | 3.20 | 1.60602 | 57.4 |
|  | 12 | −16.600 | 0.80 |  |  |
|  | 13 | 50.311 | 0.6 | 1.75520 | 27.5 |
|  | 14 | 9.535 | Variable |  |  |
| 4 | 15 | 9.955 | 0.80 | 1.80518 | 25.5 |
|  | 16 | 6.116 | 2.90 | 1.60602 | 57.4 |
|  | 17 | −24.743 | Variable |  |  |
| 5 | 18 | ∞ | 4.00 | 1.51633 | 64.1 |
|  | 19 | ∞ | — |  |  |

The eleventh, twelfth and seventeenth surfaces are aspherical surfaces having respective coefficients of asphericity as tabulated in Table 22.

TABLE 22

|  | 11th Face | 12th Face | 17th Face |
|---|---|---|---|
| K | −8.55168E − 1 | −6.22739 | 9.19465 |
| D | −7.33785E − 5 | 8.97694E − 5 | 2.73081E − 4 |
| E | −2.53188E − 6 | −4.46316E − 6 | 4.81603E − 6 |
| F | 1.86967E − 7 | 2.43688E − 7 | −1.25534E − 7 |
| G | −2.84707E − 9 | −3.90964E − 9 | 4.11777E − 9 |

The lengths of air spaces along he optical axis, which are variable with changes in focal length upon zooming and which are exhibited when the zoom lens assembly is focused at an object spaced 2 meters away from the front of the zoom lens assembly, are tabulated in Table 23.

TABLE 23

| | Object at 2 meters away | | |
|---|---|---|---|
|  | Wide-angle End | Standard Set. | Telephoto End |
| f | 4.766 | 25.168 | 46.671 |
| F/NO | 1.853 | 2.233 | 2.707 |
| d5 | 0.800 | 9.655 | 12.167 |
| d10 | 13.260 | 4.405 | 1.893 |
| d14 | 6.208 | 1.798 | 5.102 |
| d17 | 2.012 | 6.422 | 3.117 | wherein f and F/NO represent the focal length and the F-number, respectively.

Figure 21A:
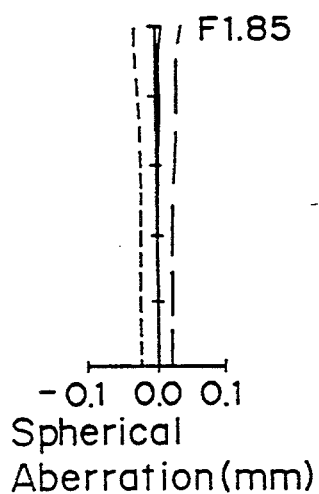
Figure 21B:
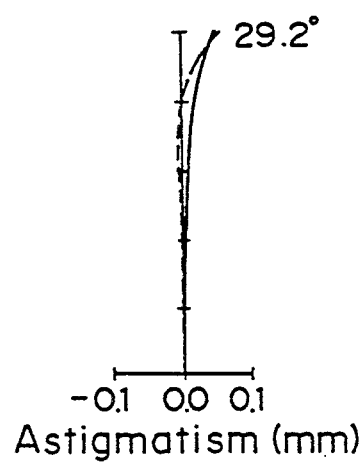
Figure 21C:
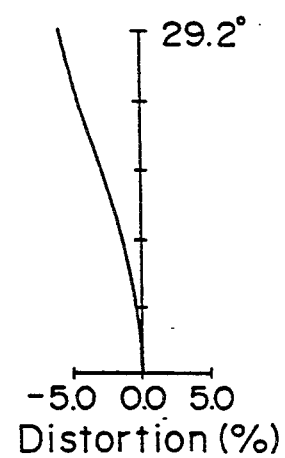
Figure 22A:
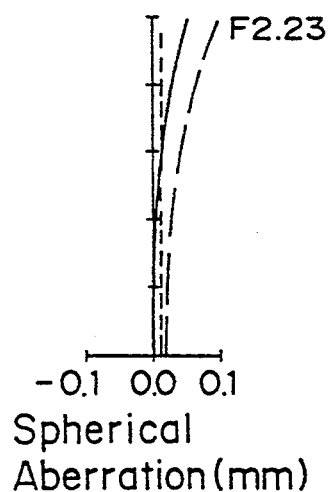
Figure 22B:
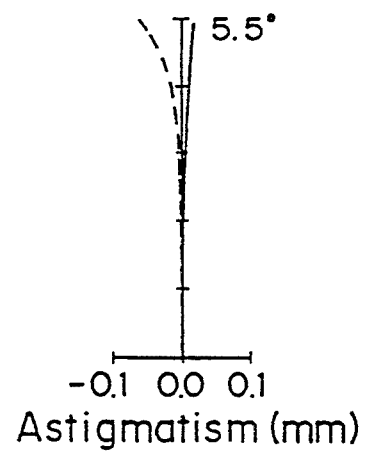
Figure 22C:
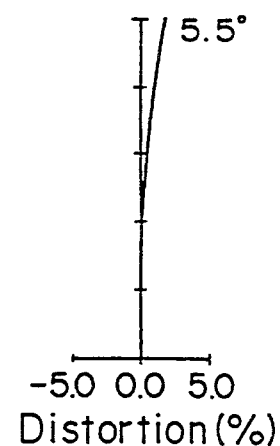

Spherical aberration, astigmatism and field distortion all exhibited by the seventh embodiment of the present invention are shown in FIGS. 21(a) to 21(c) when the zoom lens assembly is set at the wide-angle end, FIGS. 22(a) to 22(c) when the zoom lens assembly is set at the standard setting and FIGS. 23(a) to 23(c) when the zoom lens assembly is set at the telephoto end, respectively. It is to be noted that, in each of FIGS. 21(a), 22(a) and 23(a), solid lines, dotted lines and broken lines represent respective values relative to the d-line, the F-line and the C-line and that in each of FIGS. 21(b), 22(b) and 23(b) solid lines and dotted lines represent aberrations at meridional and sagittal image planes, respectively.

The diameter and the Z-value of the negative lens forming a part of the fourth lens group 4 employed in any one of the first to fourth embodiments of the present invention are tabulated in Table 24. This Table 24 makes it clear that the Z-value in any one of the fourth to seventh embodiments of the present invention is greater than 0.09 and, therefore, the possible centering error can be minimized during the centering process.

TABLE 24

| Embodiment | D | Z-value |
| --- | --- | --- |
| 4 | 6.8 | 0.103 |
| 5 | 6.9 | 0.098 |
| 6 | 7.2 | 0.100 |
| 7 | 7.2 | 0.113 |

A video camera according to the present invention is schematically shown in FIG. 24. As shown therein, the video camera comprises at least the high magnification zoom lens assembly 11 of any one of the previously described embodiments, an imaging element 12, a signal processing circuit 13 and a viewfinder 14 and, with these component parts, a compact and lightweight, high performance video camera can be realized.

Although the present invention has been described in connection with the preferred embodiments thereof with reference to the accompanying drawings, it is to be noted that various changes and modifications will become apparent to those skilled in the art. For example, although the positive lens forming a part of the third lens group 3 has been described as having an aspherical surface, the present invention can be equally applied to the use of a negative lens having an aspherical surface or the use of both lenses having an aspherical surface.

Also, although the cemented lenses forming parts of the fourth lens group 4 have been described as including a positive lens having an aspherical surface, the present invention can be equally applied to the use of the negative lens having an aspherical surface or the use of aspherical lenses both having cemented aspherical surfaces.

Accordingly, such changes and modifications are to be understood as being included within the scope of the present invention as defined by the appended claims, unless they otherwise depart therefrom.

What is claimed is:

1. A zoom lens assembly which comprises, in succession from the object side:

a first lens group having a positive refractive power and fixed relative to an image plane;

a second lens group having a negative refractive power, said second lens group being movable along an optical axis of the zoom lens assembly to effect a variation of image magnification;

a third lens group having a positive refractive power and a light condensing function, said third lens group being fixed relative to the image plane; and a fourth lens group having a positive refractive power and being movable along the optical axis to keep the image plane, which would displace as a result of movement of the second lens group and that of an object to be photographed, at a predetermined position spaced from a reference plane; and wherein the first lens group includes a negative lens, a positive lens and a positive meniscus lens in succession from the object side;

wherein the second lens group includes a negative meniscus lens, a negative lens and a positive lens in succession from the object side;

wherein the third lens group has at least one aspherical surface and includes a positive lens and a negative lens in succession from the object side; and wherein the fourth lens group includes at least one aspherical surface, and a negative lens and a positive lens in succession from the object side, said negative and positive lenses of said fourth lens group being cemented together.

2. The zoom lens assembly as claimed in claim 1, wherein the positive lens of said third lens group has a convex surface oriented towards the object side, and the negative lens of said third lens group has a concave surface oriented towards the image plane.

3. The zoom lens assembly as claimed in claim 1, wherein the negative lens of said fourth lens group has a concave surface oriented towards the image panel and the positive lens of said fourth lens group has a convex surface oriented towards the object side.

4. The zoom lens assembly as claimed in claim 1, wherein the zoom lens assembly satisfies the following conditions:

(1) $3.0 < f1/fW < 8.0$
   (2) $0.5 < |f2|/fW < 1.6$
   (3) $2.0 < f3/fW < 7.0$
   (4) $2.0 < f4/fW < 5.0$
   (5) $0.02 < d14/f4 < 1.0$
   (6) $0.3 < r11/f3 < 1.5$
   (7) $0.3 < |r14|/f4 < 2.0$
   (8) $0.2 < |r16|/f4 < 1.5$ wherein fW represents the focal length at a wide-angle end; fi (i=1, 2, 3 and 4) represents the focal length of the i-th lens group; d14 represents the length of an air space between the third and fourth lens groups as taken along the optical axis; r11 represents the radius of curvature of an object side surface of the positive lens of said third lens group; r14 represents the radius of curvature of an image side surface of the negative lens of said third lens group; and r16 represents the radius of curvature of the cemented surfaces of the lenses of said fourth lens group.

5. The zoom lens assembly as claimed in claim 1, wherein the negative lens of the fourth lens group has a Z-value chosen to satisfy the following condition:

(9) $Z = (1/r16 - 1/r15) \cdot D/4 > 0.09$ wherein r15 represents the radius of curvature of an object side surface of the negative lens forming of said fourth lens group r16 represents the radius of curvature of the cemented surfaces of the cemented lenses of said fourth lens group; and D represents the diameter of the negative lens of said fourth lens group.

6. The zoom lens assembly as claimed in claim 1, wherein the second negative lens of said second lens group from the object side has opposite concave surfaces of equal radii of curvature.

7. A video camera comprising: a zoom lens assembly including a first lens group having a positive refractive power and fixed relative to an image plane, a second lens group having a negative refractive power, said second lens group being movable along an optical axis of the zoom lens assembly to effect a variation of image magnification, a third lens group having a positive refractive power and a light condensing function, said third lens group being fixed relative to the image plane, and a fourth lens group having a positive refractive power and being movable along the optical axis to keep the image plane, which would displace as a result of movement of the second lens group and that of an object to be photographed, at a predetermined position spaced from a reference plane, and wherein the first lens group includes a negative lens, a positive lens and a positive meniscus lens in succession from the object side, wherein the second lens group includes a negative meniscus lens, a negative lens and a positive lens in succession from the object side, wherein the third lens group has at least one aspherical surface and includes a positive lens and a negative lens in succession from the object side, and wherein the fourth lens group includes at least one aspherical surface, and a negative lens and a positive lens in succession from the object side, said negative and positive lenses of said fourth lens group being cemented together; an imaging element; a signal processing circuit; and a viewfinder.

* * * * *